United States Patent [19]

Nagayama et al.

[11] Patent Number: 5,779,453
[45] Date of Patent: Jul. 14, 1998

[54] VACUUM PUMP MOTOR ARRANGEMENT HAVING REDUCED HEAT GENERATION

[75] Inventors: Masami Nagayama; Katsuaki Usui; Kozo Matake; Yoshinori Ojima; Genichi Sato; Yasushi Hisabe, all of Kanagawa-ken, Japan

[73] Assignee: Ebara Corporation, Tokyo, Japan

[21] Appl. No.: 778,499

[22] Filed: Jan. 3, 1997

Related U.S. Application Data

[63] Continuation of Ser. No. 618,117, Mar. 19, 1996, abandoned.

[30] Foreign Application Priority Data

Mar. 20, 1995 [JP] Japan ................. 7-087542

[51] Int. Cl.⁶ ............... F04B 35/04; F04B 53/08
[52] U.S. Cl. ............... 417/410.4; 417/373; 417/410.3; 417/423.7
[58] Field of Search ............... 417/373, 410.3, 417/410.4, 423.4, 423.7, 423.8, 423.14; 418/8, 209.1

[56] References Cited

U.S. PATENT DOCUMENTS

| 1,612,330 | 12/1926 | Trumpler . | |
|---|---|---|---|
| 2,937,807 | 5/1960 | Lorenz | 417/410.4 |
| 3,378,710 | 4/1968 | Martin, Jr. . | |
| 3,572,982 | 3/1971 | Kozdon | 417/423.7 |
| 4,797,071 | 1/1989 | Veyrat | 417/410.3 |
| 5,045,026 | 9/1991 | Buse | 417/423.14 |
| 5,354,179 | 10/1994 | Maruyama et al. | 417/410.3 |

FOREIGN PATENT DOCUMENTS

| 0 206 009 | 12/1986 | European Pat. Off. . | |
|---|---|---|---|
| 0 678 966 | 10/1995 | European Pat. Off. . | |
| 2668209 | 4/1992 | France | 417/410.4 |
| 1125770 | 3/1962 | Germany | 417/373 |
| 2034327 | 1/1972 | Germany | 417/423.4 |
| 94 01 967 | 4/1994 | Germany . | |
| 59-97558 | 7/1984 | Japan . | |
| 4 17 8143 | 10/1992 | Japan . | |

*Primary Examiner*—Charles G. Freay
*Attorney, Agent, or Firm*—Armstrong, Westerman, Hattori, McLeland & Naughton

[57] ABSTRACT

A vacuum pump has a pump casing having a suction side where a suction port is located and a discharge side where a discharge port is located, a pump assembly housed in the pump casing and comprising a pair of pump rotors rotatable in synchronism with each other and having respective shafts, and a brushless direct-current motor mounted on the pump casing at a suction side of the pump casing. The motor has a pair of motor rotors comprising respective sets of permanent magnets which are mounted respectively on the shafts, a pair of cans surrounding outer circumferential and end surfaces of the motor rotors in sealing relation to the pump assembly, a motor stator mounted on the cans and housed in a water-cooled motor frame.

6 Claims, 6 Drawing Sheets

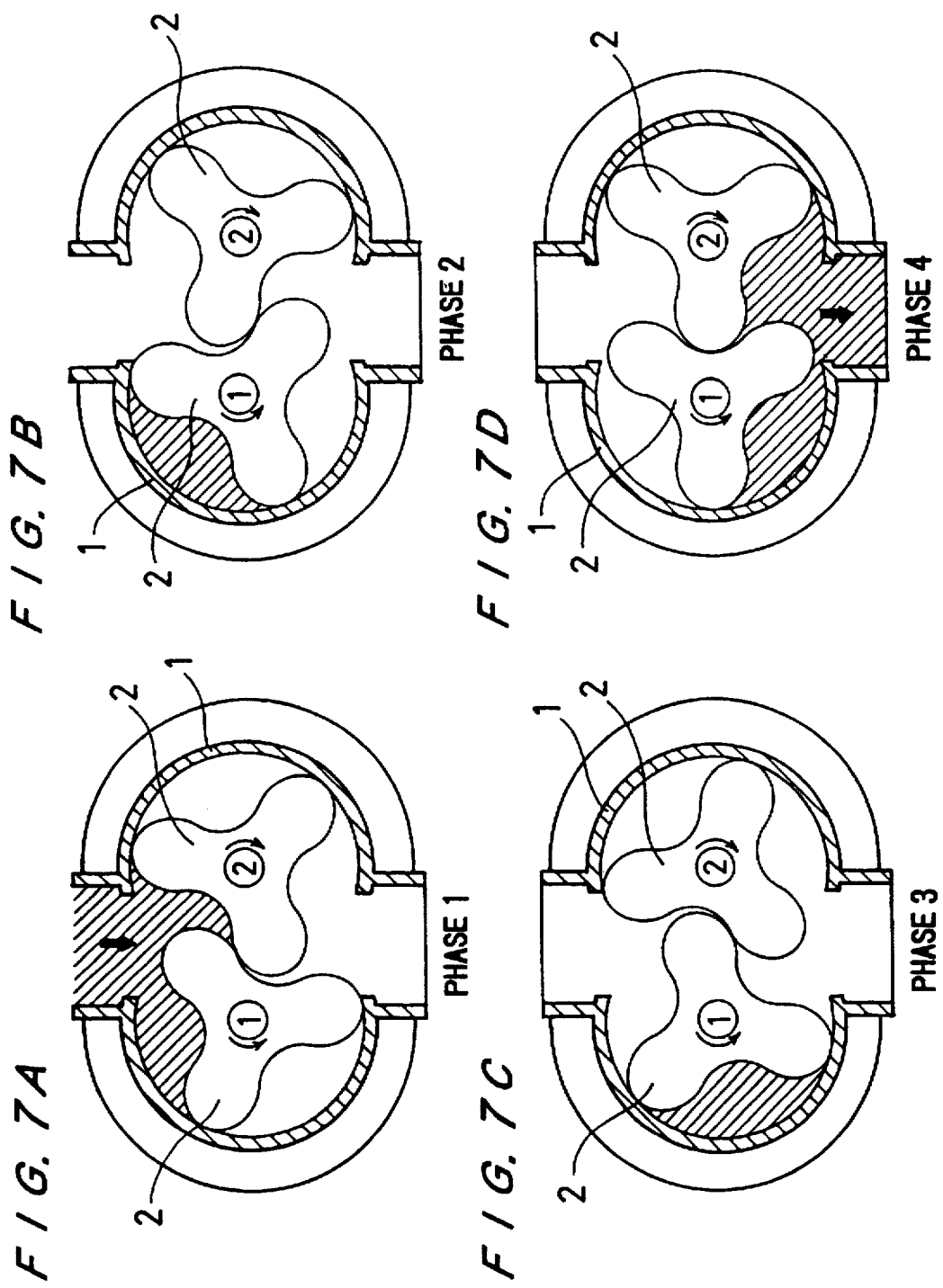

VACUUM PUMP MOTOR ARRANGEMENT HAVING REDUCED HEAT GENERATION

This is a continuation of application Ser. No. 08/618,117 filed Mar. 19, 1996, now abandoned.

BACKGROUND OF THE INVENTION

1. Field of the Invention

The present invention relates to a vacuum pump, and more particularly to a positive-displacement vacuum pump which is preferably used in the fabrication of semiconductor devices and can be operated from atmospheric pressure.

2. Description of the Related Art

There has heretofore been known a vacuum pump called a Roots pump which has a pair of lobe-shaped pump rotors to rotate synchronously in opposite directions for exhausting a gas from a space that is to be maintained at subatmospheric pressure. The pump rotors are rotatably housed in a casing for rotation in the opposite directions. The pump rotors are kept out of contact with each other with a small gap therebetween, and the pump rotors and inner wall surface of the casing are also kept out of contact with one another with a small gap therebetween. One type of such a Roots pump has pump rotors arranged in multiple stages for developing a pressure of about $10^{-3}$ Torr at a suction port with the atmospheric pressure at a discharge port. During operation, the pump rotors near the suction port are kept at a relatively low temperature of about 100° C., but the temperature of the pump rotors rises progressively toward the discharge port due to a compressive action between the rotor stages, and the pump rotors near the discharge port are heated to about 200° C.

Conventionally, such vacuum pumps have been driven by a squirrel-cage induction motor which is of a canned structure having a squirrel-cage motor rotor. The squirrel-cage motor rotor comprises laminated iron cores with rotor bars disposed in grooves defined in the laminated iron cores, and end rings interconnecting the ends of the rotor bars. The squirrel-cage motor rotor is coupled directly to an end of the shaft of the vacuum pump. However, the squirrel-cage induction motor has a very low efficiency because of the heat produced by the motor rotor due to a secondary loss resulting from an increased secondary resistance of the motor and also because of the heat generated by the vacuum pump.

If the temperature of the pump is lowered to reduce the temperature of the motor rotor, then reactive products contained in gases that flow through the vacuum pump in a process of fabricating semiconductor devices tend to be deposited in the vacuum pump, thus shortening the service life of the vacuum pump. Consequently, it is not preferable to substantially lower the temperature of the pump for the purpose of reducing the temperature of the motor rotor.

The heat generated by the motor rotor is transferred to the can of the motor primarily through radiation since no thermal transfer medium is present in the vacuum developed in the vacuum pump. The heat transferred to the can of the motor is then transferred to the stator core and then to the motor frame. The amount of heat thus transferred is relatively small, and hence it is difficult to cool the motor rotor effectively. While the vacuum pump is in operation, the motor rotor is kept at a relatively high temperature ranging from about 200 to 300° C.

SUMMARY OF THE INVENTION

It is therefore an object of the present invention to provide a vacuum pump which is driven by a motor with an improved efficiency that is achieved by reducing the heat generated by motor rotors and cooling the motor rotors with an increased efficiency.

According to the present invention, there is provided a vacuum pump comprising: a pump casing having a suction side where a suction port is located and a discharge side where a discharge port is located; a pump assembly housed in the pump casing and comprising a pair of pump rotors rotatable in synchronism with each other and having respective shafts; and a motor mounted on the pump casing at the suction side of the pump casing, the motor comprising a pair of motor rotors having respective sets of permanent magnets which are mounted respectively on the shafts, a pair of cans surrounding outer circumferential and end surfaces of the motor rotors in sealing relation to the pump assembly, and a motor stator disposed around the cans and housed in a motor frame.

The permanent magnets of the motor rotors comprises a bonded magnet made of mixture of magnetic powder and synthetic resin.

The vacuum pump may further comprise a molded body housed in the water-cooled motor frame and encasing the motor stator core, the coils, and the cans.

The cans may have black inner surfaces and the motor rotors have black outer surfaces.

The motor may comprise a brushless direct-current motor.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIGS. 7A, 7B, 7C, and 7D are cross-sectional views illustrative of the manner in which Roots rotors of the vacuum pump shown in FIG. 1 operate.

DETAILED DESCRIPTION OF THE PREFERRED EMBODIMENT

Figure 1:
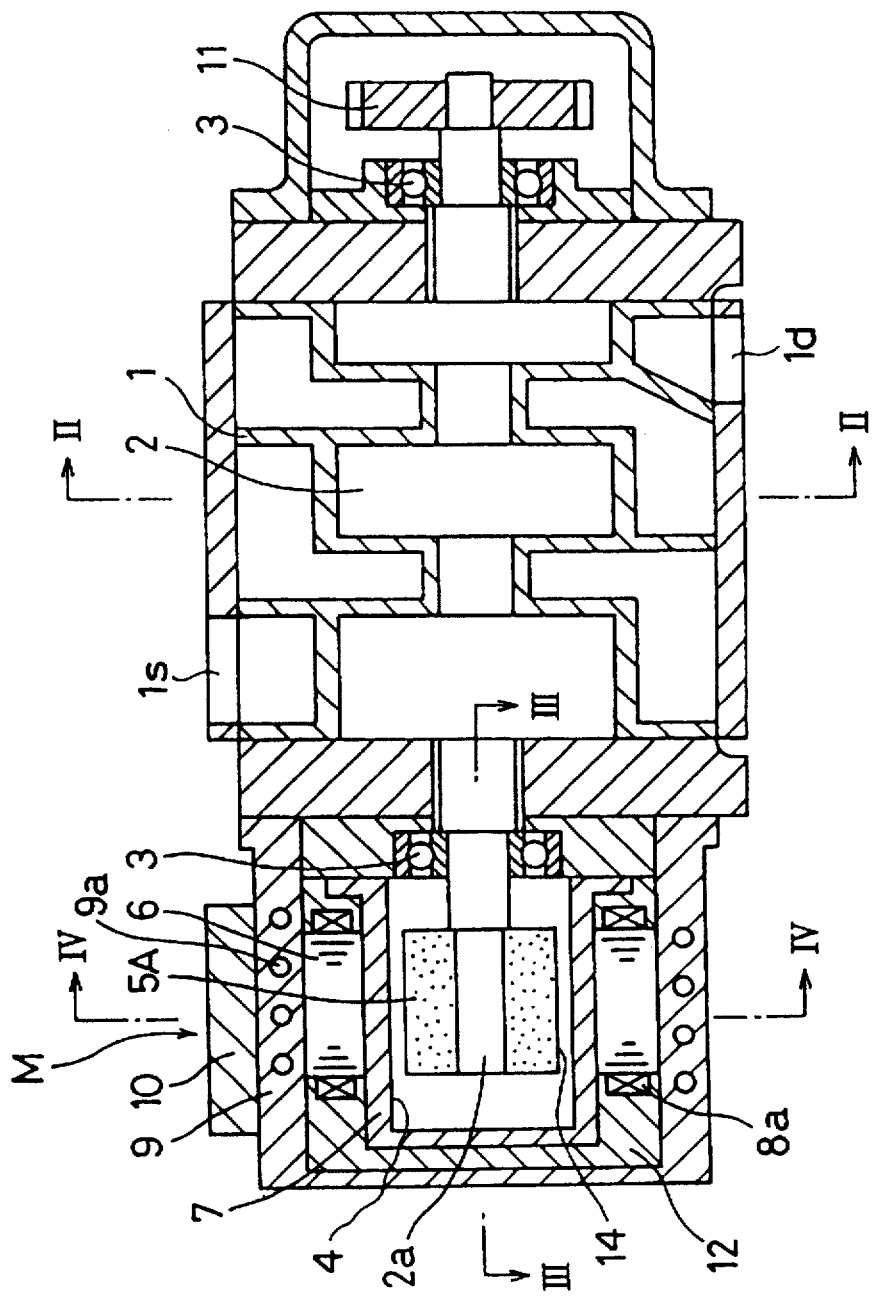
FIG. 1 is a longitudinal cross-sectional view of a vacuum pump according to an embodiment of the present invention.
Figure 2:
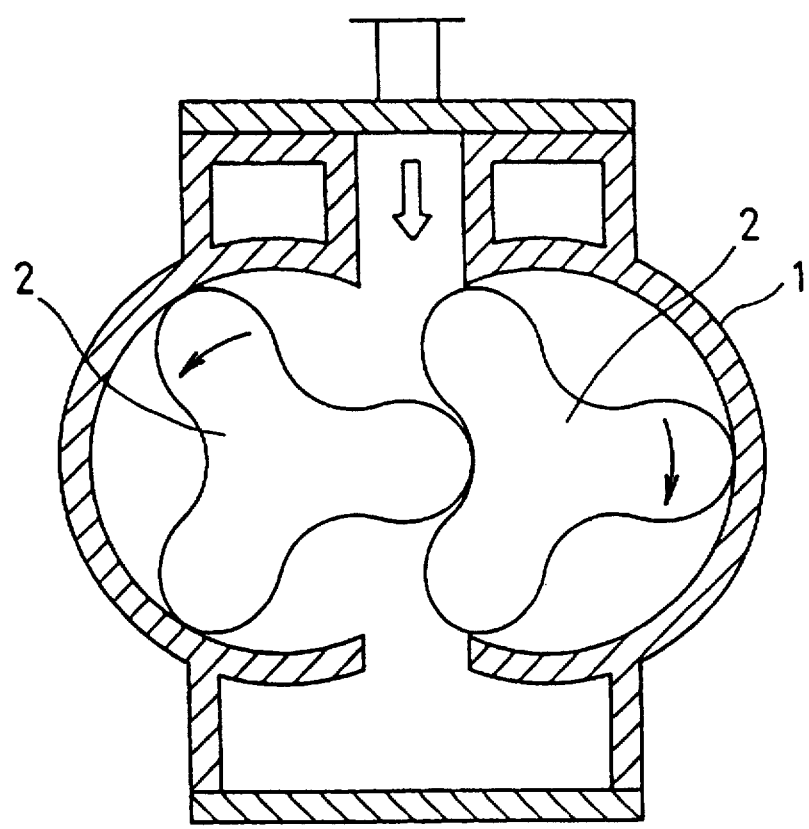
FIG. 2 is a cross-sectional view taken along line II—II of FIG. 1.

As shown in FIGS. 1 and 2, a vacuum pump according to the present invention comprises a pump casing 1 and a pair of Roots rotors 2 as pump rotors rotatably housed in the pump casing 1. The pump casing 1 has an elongated body having a suction side where a suction port is is located and a discharge side where a discharge port id is located. Each of the Roots rotors 2 is rotatably supported at its ends by bearings 3 mounted respectively on opposite axial ends of the pump casing 1. The Roots rotors 2 can be rotated about their own axes by a double-shaft brushless direct-current motor M mounted on one of the axial ends of the pump casing 1. The direct-current motor M is located at the suction side of the pump casing 1.

Figure 3:
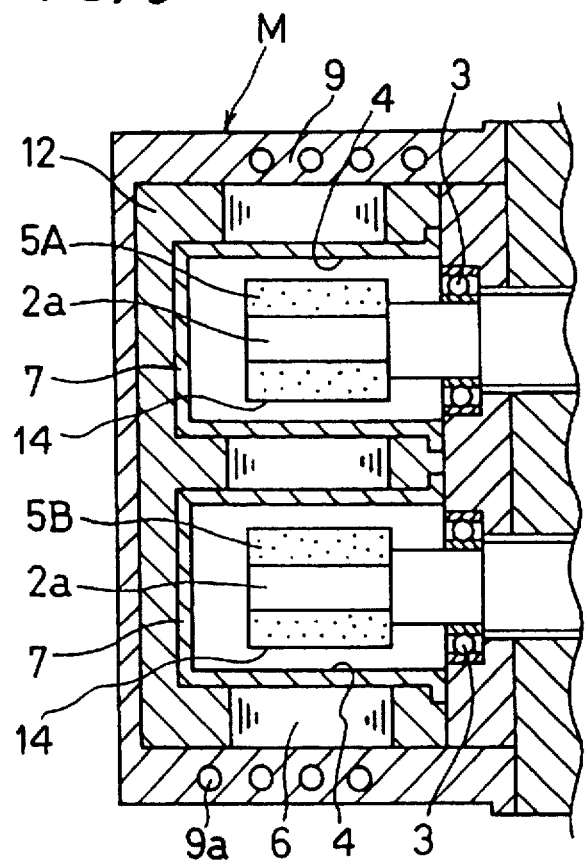
FIG. 3 is a cross-sectional view taken along line III—III of FIG. 1.
Figure 4:
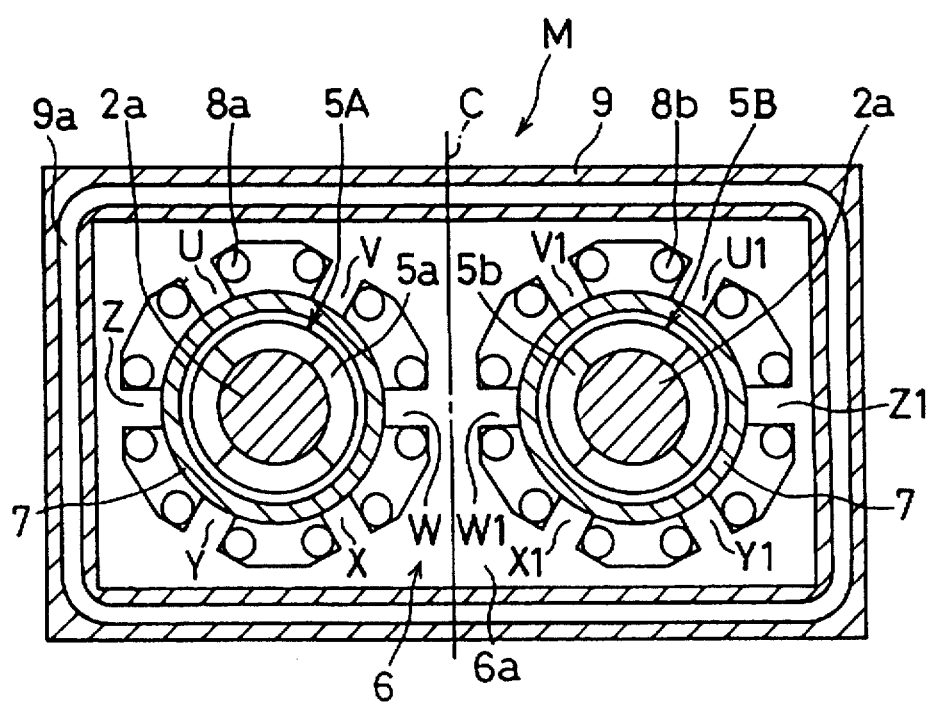
FIG. 4 is a cross-sectional view taken along line IV—IV of FIG. 1.

FIGS. 3 and 4 show structural details of the double-shaft brushless direct-current motor M. As shown in FIGS. 3 and 4, the double-shaft brushless direct-current motor M have two motor rotors 5A, 5B fixedly mounted on respective ends 2a of the shafts of the Roots rotors 2. The motor rotors 5A, 5B are located at the suction side of the vacuum pump. The motor rotors 5A, 5B comprise respective sets of $2n$ (n is an integer) permanent magnets 5a, 5b mounted respectively on the shaft ends 2a at equal circumferential intervals for generating radial magnetic fluxes.

Figure 5A:
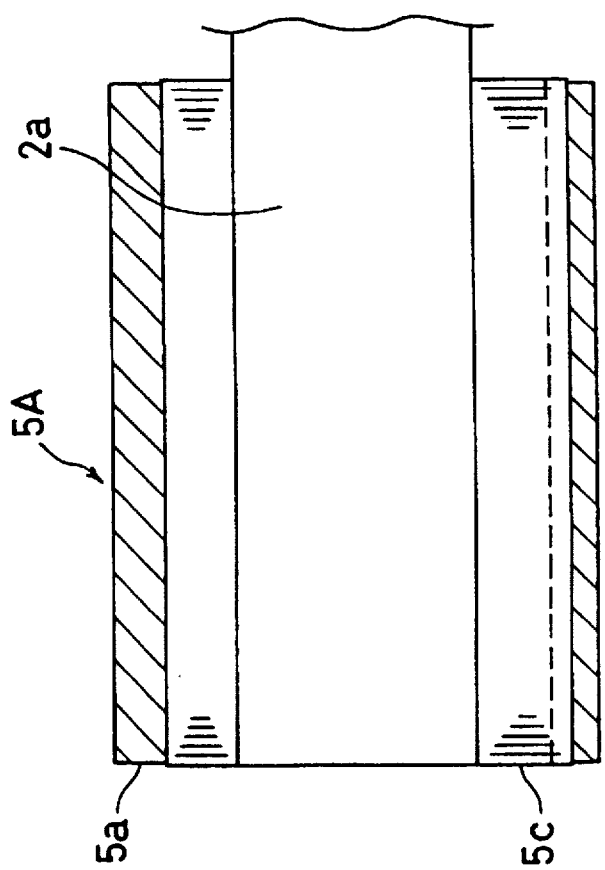
FIG. 5A is a side elevational view of a motor rotor.
Figure 5B:
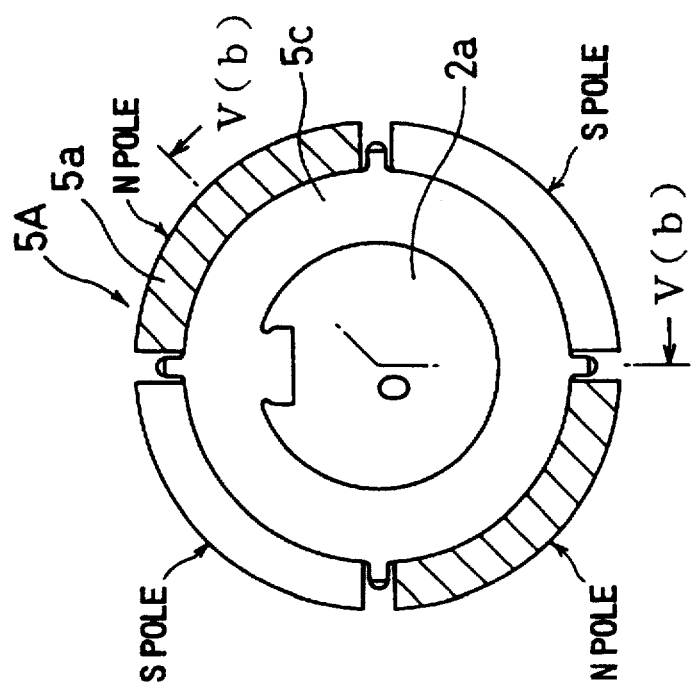
FIG. 5B is a cross-sectional view taken along line V(b)—V(b) of FIG. 5A.

The motor rotor 5A is shown in detail in FIGS. 5A and 5B. The motor rotor 5B is not shown in detail as it is identical to the motor rotor 5A. As shown in FIG. 5A, the motor rotor 5A comprises four permanent magnets 5a of S, N, S, N poles that are mounted on an outer circumferential surface of a core 5c which is mounted on the shaft end 2a. The core 5c comprises laminated sheets of silicon steel, as shown in FIG. 5B.

As shown in FIGS. 1, 3, and 4, the double-shaft brushless direct-current motor M has a pair of cylindrical cans 7 made of a corrosion-resistant material or synthetic resin disposed around the respective motor rotors 5A, 5B, and a motor stator 6 disposed around outer circumferential surfaces of the cans 7. The cans 7, which serve as vacuum containers for developing a vacuum therein, cover outer circumferential surfaces and axial end surfaces of the motor rotors 5A, 5B in spaced relation thereto, thus sealing a pump assembly of the vacuum pump which includes the Roots rotors 2. That is, vacuum is developed inside the cans 7. The inner surfaces 4 of the cans 7 and the outer surfaces 14 of the motor rotors 5A, 5B are black in color.

The motor stator 6 is housed in a water-cooled motor frame 9 attached to the pump casing 1 and having a water jacket 9a. The motor stator 6 comprises a motor stator core 6a disposed in the water-cooled motor frame 9 and comprising laminated sheets of silicon steel, and a pair of sets of coils 8a, 8b supported in the motor stator core 6a in surrounding relation to the cans 7.

As shown in FIG. 4, the motor stator core 6a has a first group of six magnetic pole teeth U, V, W, X, Y, Z extending radially inwardly at circumferentially equal intervals, and a second group of six magnetic pole teeth U1, V1, W1, X1, Y1, Z1 extending radially inwardly at circumferentially equal intervals. The coils 8a are mounted respectively on the magnetic pole teeth U, V, W, X, Y, Z, and the coils 8b are mounted respectively on the magnetic pole teeth U1, V1, W1, X1, Y1, Z1. The coils 8a, 8b thus mounted on the respective magnetic pole teeth are symmetrically arranged with respect to a central plane C lying intermediate between the motor rotors 5A, 5B, and wound in opposite directions such that they provide magnetic poles of opposite polarities. The water-cooled motor frame 9 houses therein a molded body 12 made of rubber, synthetic resin, or the like which is held in intimate contact therewith and encases the motor stator core 9, the coils 8a, 8b, and the cans 7.

As shown in FIG. 1, a motor driver 10 is fixedly mounted on an outer circumferential surface of the motor frame 9. The motor driver 10 has a driver circuit (not shown) electrically connected to the coils 8a, 8b for energizing the double-shaft brushless direct-current motor M to actuate the vacuum pump.

Two timing gears 11 (one shown in FIG. 1) are fixedly mounted on respective ends of the shafts of the Roots rotors 2 remotely from the double-shaft brushless direct-current motor M. The timing gears 11 serve to prevent the Roots rotors 2 from rotating out of synchronism with each other under accidental disturbing forces.

Figure 6A:
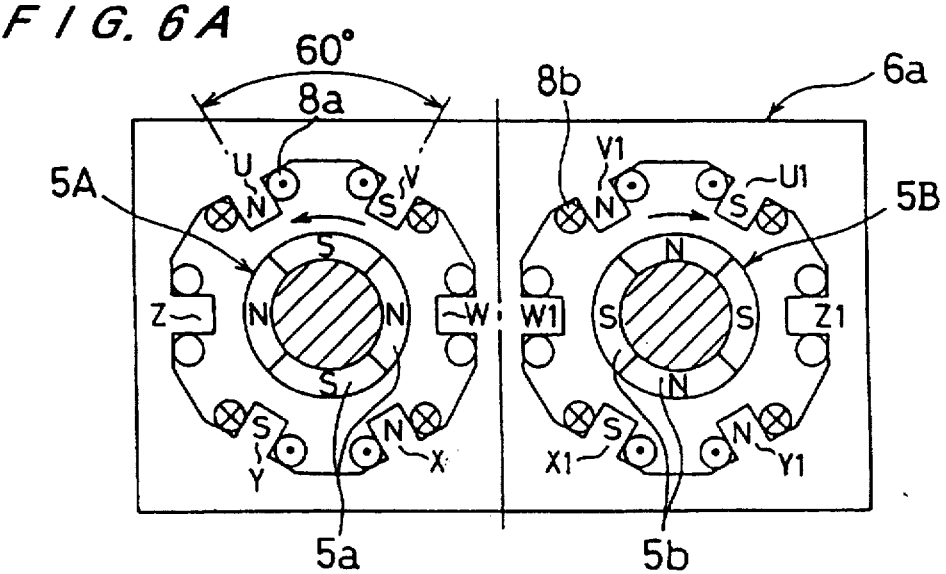
FIGS. 6A, 6B, and 6C are cross-sectional views illustrative of the manner in which a double-shaft brushless direct-current motor of the vacuum pump shown in FIG. 1 operates.
Figure 6B:
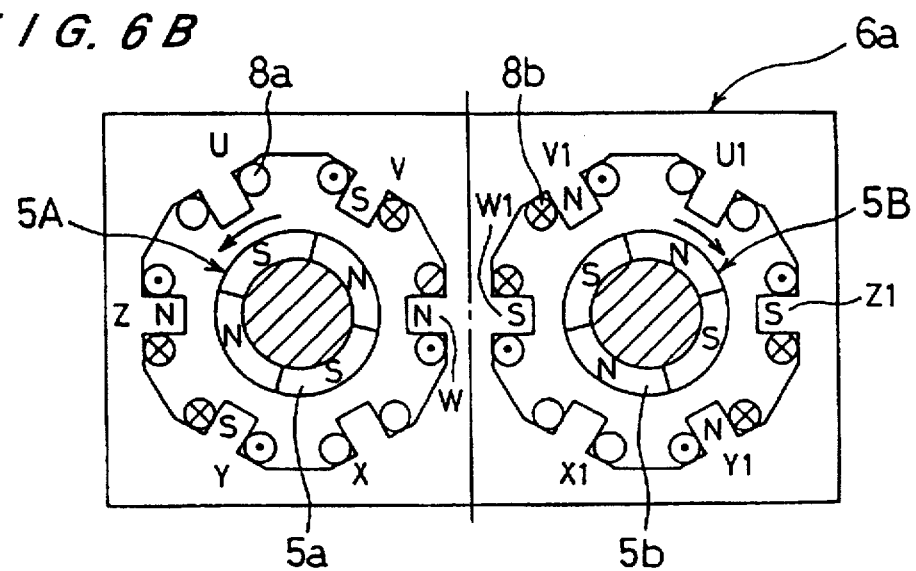
Figure 6C:
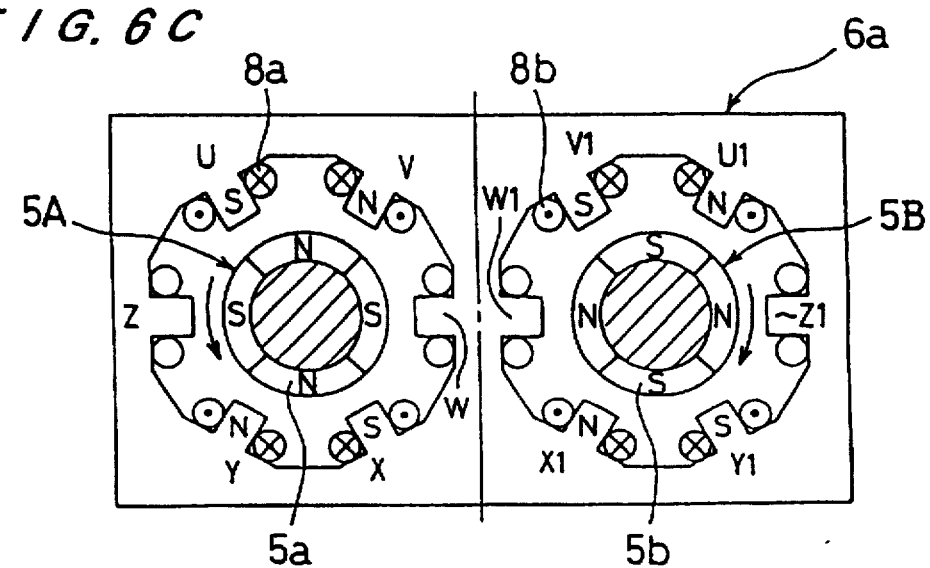

Operation of the vacuum pump will be described below with reference to FIGS. 6A—6C and 7A—7D. FIGS. 6A—6C are illustrative of the manner in which the double-shaft brushless direct-current motor M operates. The cans 7 and the molded body 12 are omitted from illustration in FIGS. 6A—6C.

When the coils 8a, 8b of the double-shaft brushless direct-current motor M are energized by the motor driver 10, they develop a spatial moving magnetic field in the motor stator core 6a for rotating the motor rotors 5A, 5B in opposite directions.

Specifically, as shown in FIG. 6A, when the coils 8a, 8b are energized such that N poles are developed on the magnetic pole teeth U, X, S poles are developed on the magnetic pole teeth V, Y, S poles are developed on the magnetic pole teeth U1, X1, and N poles are developed on the magnetic pole teeth V1, Y1, all simultaneously, the motor rotors 5A, 5B are rotated in the opposite directions indicated by the arrows.

When the coils 8a, 8b are energized such that S poles are developed on the magnetic pole teeth V, Y, N poles are developed on the magnetic pole teeth W, Z, N poles are developed on the magnetic pole teeth V1, Y1, and S poles are developed on the magnetic pole teeth W1, Z1, all simultaneously, as shown in FIG. 6B, the motor rotors 5A, 5B are rotated in the opposite directions indicated by the arrows.

Further, when the coils 8a, 8b are energized such that S poles are developed on the magnetic pole teeth X, U, N poles are developed on the magnetic pole teeth Y, V, N poles are developed on the magnetic pole teeth X1, U1, and S poles are developed on the magnetic pole teeth Y1, V1, all simultaneously, as shown in FIG. 6C, the motor rotors 5A, 5B are rotated under continuous rotational forces in the opposite directions indicated by the arrows.

Magnetic fields generated by the permanent magnets 5a, 5b of the motor rotors 5A, 5B pass through a closed magnetic path that is formed between the motor rotors 5A, 5B by the motor stator core 6a. The motor rotors 5A, 5B are rotated in the opposite directions synchronously with each other due to a magnetic coupling action between unlike magnetic poles thereof.

When the motor rotors 5A, 5B are synchronously rotated in the opposite directions, the Roots rotors 2 are also synchronously rotated in the opposite directions because the Roots rotors 2 and the motor rotors 5A, 5B are coaxially provided.

FIGS. 7A—7D illustrate schematically the manner in which the Roots rotors 2 operate in a certain stage such as a first stage. As shown in FIGS. 7A—7B, the Roots rotors 2 are rotated in the opposite directions out of contact with each other with slight gaps left between the Roots rotors 2 and the inner circumferential surface of the pump casing 1 and also between the Roots rotors 2 themselves. As the Roots rotors 2 are rotated successively from Phase 1 (FIG. 7A) to Phase 4 (FIG. 7D), a gas drawn from a suction side is confined between the Roots rotors 2 and the pump casing 1 and transferred to a discharge side. Each of the Roots rotors 2 is shown as a three-lobe-shaped Roots rotor. Since the three-lobe-shaped Roots rotor has three valleys between the lobes, the gas is discharged six times in one revolution. The gas discharged from a certain stage such as the first stage is introduced into the next stage such as a second stage.

The vacuum pump according to the present invention employs the brushless direct-current motor M in which the motor rotors 5A, 5B are composed of the permanent magnets 5a, 5b mounted on the cores 5c on the shaft ends 2a. This structure is effective to greatly reduce the amount of heat generated by the motor rotors 5A, 5B because the motor rotors 5A, 5B are free of any secondary loss resulting from a secondary resistance. Inasmuch as the amount of heat generated by the motor rotors 5A, 5B is relatively small, the efficiency of the brushless direct-current motor M is relatively high, e.g., at least 10% higher than conventional motors which are used in vacuum pumps.

Since the motor rotors 5A, 5B are mounted on the shaft ends 2a located at the suction side of the vacuum pump, the amount of heat transferred from the pump assembly to the motor rotors 5A, 5B is relatively small. Generally, permanent magnets are demagnetized at high temperatures, and are greatly demagnetized at temperatures in excess of 100° C. However, since the motor rotors 5A, 5B are not subject to high temperatures, they are not significantly demagnetized during operation of the vacuum pump, and hence are not required to use permanent magnets which are less demagnetized at high temperatures and are expensive.

Further, in the present invention, since the permanent magnets 5a, 5b are a bonded magnet composed of a mixture of magnetic powder and synthetic resin, the eddy current is prevented from being generated in the permanent magnets 5a, 5b, resulting in reducing the heat generated in the motor rotors 5A, 5B to a minimum degree.

In order to increase the cooling effect of the motor rotors 5A, 5B, the inner surfaces of the cans 7 and the outer surfaces of the motor rotors 5A, 5B are black in color for thereby increasing the amount of heat radiated from the motor rotors 5A, 5B to the cans 7.

The heat generated by the motor rotors 5A, 5B is transferred to the water-cooled motor frame 9 through different heat transfer paths. One of the heat transfer paths extends from the motor rotors 5A, 5B through the cans 7 and the stator core 6a to the water-cooled motor frame 9. The other heat transfer path extends from the motor rotors 5A, 5B through the cans 7 and the molded body 12, which intimately contacts the water-cooled motor frame 9 and encases the motor stator core 9, the coils 8a, 8b, and the cans 7, to the water-cooled motor frame 9. These different heat transfer paths are effective to cool the motor rotors 5A, 5B efficiently. The molded body 12 that encases the cans 7 reinforces the cans 7 as vacuum containers. Even when the cans 7 are damaged or ruptured for some reason, the molded body 12 is effective to keep a vacuum in the cans 7, thus preventing a large amount of ambient air from entering therein. Therefore, the molded body 12 increases the safety of the vacuum pump by preventing an accident caused by a reaction between ambient air and reactive gas such as silane gas in the process of fabricating semiconductor devices, from occurring.

The molded body 12 is also effective as a damper for attenuating noise which is produced by the moving parts of the vacuum pump and propagated from the interior of the vacuum pump to the outside thereof.

In the embodiment described above, a two-shaft vacuum pump and a two-shaft motor have been shown and described as being embodied for a vacuum pump. However, the same result are obtainable in a single shaft vacuum pump or a two-shaft vacuum pump which is driven by a single shaft motor.

As is apparent from the above description, the present invention offers the following advantages:

(1) Since the vacuum pump employs the direct-current motor in which the motor rotors are composed of the permanent magnets, the secondary loss generated in the motor rotors is eliminated and the amount of heat generated by the motor rotors is greatly reduced. Thus, the efficiency of the motor is enhanced to the degree of at least 10% higher than conventional motors which are used in vacuum pumps.

(2) Since the motor rotors are mounted on the shaft ends located at the suction side of the vacuum pump, the amount of heat transferred from the pump assembly to the motor rotors is relatively small, and the temperature of the permanent magnets can be reduced. Thus, the permanent magnets having characteristics which are less demagnetized at high temperature and are expensive are not required to be used, resulting in reducing a manufacturing cost of the vacuum pump.

(3) Since the permanent magnets are a bonded magnet composed of a mixture of magnetic powder and synthetic resin, the eddy current is prevented from being generated in the permanent magnets, thus reducing the heat generated in the motor rotors.

(4) In order to increase the cooling effect of the motor rotors, the inner surfaces of the cans and the outer surfaces of the motor rotors are black in color for thereby increasing the amount of heat radiated from the motor rotors to the cans.

(5) Since the water-cooled motor frame, the cans, the coils and the stator core are molded by a molding, the cooling effect of the motor rotors can be enhanced. Further, the cans as vacuum containers are reinforced by the molding which also serves to prevent vacuum break when the cans are damaged or ruptured and to reduce noise of the vacuum pump.

Although a certain preferred embodiment of the present invention has been shown and described in detail, it should be understood that various changes and modifications may be made therein without departing from the scope of the appended claims.

What is claimed is:

1. A vacuum pump comprising:
a pump casing having a suction side where a suction port is located and a discharge side where a discharge port is located;
a pump assembly housed in said pump casing and comprising a pair of pump rotors rotatable in synchronism with each other and having respective shafts; and
a motor mounted on said pump casing at said suction side of said pump casing, said motor comprising a pair of motor rotors having respective sets of permanent magnets which are mounted respectively on said shafts, a pair of cans surrounding outer circumferential and end surfaces of said motor rotors in sealing relation to said pump assembly, and a motor stator disposed around said cans and housed in a motor frame.

2. A vacuum pump according to claim 1, wherein said permanent magnets comprise a bonded magnet composed of a mixture of magnetic powder and synthetic resin.

3. A vacuum pump according to claim 1 or 2, wherein said motor stator comprises a motor stator core and a pair of sets of coils supported in said motor stator core, and said motor frame comprises a water-cooled structure.

4. A vacuum pump according to claim 1 or 2, further comprising a molded body housed in said motor frame and encasing said motor stator core, said coils, and said cans.

5. A vacuum pump according to claim 1, wherein said cans have black inner surfaces and said motor rotors have black outer surfaces.

6. A vacuum pump according to claim 1, wherein said motor comprises a brushless direct-current motor.

* * * * *